Patented Oct. 28, 194.

2,429,907

UNITED STATES PATENT OFFICE 2,429,907

FLAVORING COMPOSITION

Frederick J. Zimmermann and Maurice Kayner, Wausau, Wis., assignors to Salvo Chemical Corporation, Rothschild, Wis., a corporation of Wisconsin No Drawing. Application January 25, 1945, Serial No. 574,628

9 Claims. (Cl. 99—140)

1

The present invention relates to an aqueous, non-alcoholic, vanillin-containing flavoring composition.

Vanillin solutions have been extensively employed for flavoring purposes in place of extracts of vanilla. Vanilla contains about 2–3% of vanillin. Coumarin is frequently employed in conjunction with vanillin since their conjoint use produces an excellent vanilla-like flavor in foodstuffs of various types. Thorough investigation demonstrates that, contrary to some authorities, vanillin is soluble only to the extent of from 4–6 grams per liter in cold water (5°–15° C.) and 6–8 grams per liter in water at room temperature. It has not been possible, therefore, to produce an aqueous vanillin-containing flavoring composition of sufficient potency to be commercially satisfactory since a concentration of 10 grams per liter of vanillin is required as a practical minimum. As a result, it has been necessary to employ rather large percentages of alcohol (up to 35% or more) and to prepare first an alcohol solution of vanillin followed by dilution of the alcohol solution with water. The general practice is to dissolve 7–9 ounces of vanillin in 2.5 gallons of alcohol and to dilute the alcohol solution to about 10–12 gallons with water. Coumarin is less soluble in water than vanillin but since we employ only low concentrations of coumarin in our new vanillin composition we have no solubility problem in connection therewith.

Alcoholic vanillin extracts have, moreover, certain recognized disadvantages, such as too rapid volatilization during baking or at raised temperatures, high cost, and a flavoring capacity less and somewhat different than that desired or preferred, thus necessitating the use of increased amounts of the extracts, still further increasing the cost and often resulting in impaired or substandard product flavor. So far as we are aware, however, previous attempts to avoid these difficulties by the use of vanillin have been unsuccessful since they usually resulted in the conversion of the vanillin to sodium vanillin, which is practically valueless as a flavoring agent, or have proceeded along other lines, such as the use of glycerine or other organic solvents and the deliberate formation of vanillin derivatives which have, however, not improved the situation.

In accordance with the present invention, aqueous vanillin-containing flavoring compositions are produced containing sufficient vanillin (and coumarin) to provide the desired flavor and flavoring power without using alcohol and without resulting in the formation of substantial amounts of

2 sodium vanillin or other undesirable or unhelpful vanillin derivatives. Since vanillin is an aldehyde (methylprotocatechuic aldehyde or 3-methoxy-4-hydroxy-benzaldehyde) it will be appreciated that it is comparatively reactive chemically and is relatively easily converted to sodium vanillin or to other derivatives. Our new flavoring composition is characterized also by the presence of small quantities of buffer salts which maintain the pH value of the composition between 5.0 and 7.0, under which conditions the solubility of vanillin is markedly increased so that without the use of alcohol it is possible to secure a potent flavoring composition suitable for general use in flavoring foodstuffs. This is surprising in view of the fact that it is generally known that vanillin is soluble in alkali hydroxide solutions in which, of course, the pH is considerably greater than 7.0 and thus would lead to the expectation of poor solubility in neutral or acid solutions.

More specifically, our invention comprises a flavoring composition containing from about 10–15 grams per liter of vanillin and up to 2 grams per liter of coumarin plus a small amount of the sodium salt of a dibasic or tribasic acid. The pH value of the composition is adjusted to range from 5 to 7 by means of small additions of an alkali such as sodium hydroxide or an acid such as citric acid. We have found that an aqueous flavoring composition of vanillin and coumarin can be prepared of the foregoing character in which the vanillin is present in its free state and which is stable even under prolonged refrigeration. As buffer salts we employ sodium phosphates, sodium citrate and sodium tartrate. $Na_2HPO_4$ is preferred. The buffer salts may be employed as such or may be formed in situ by the use of appropriate amounts of phosphoric acid, citric acid or tartaric acid with NaOH or equivalent.

The following examples illustrate our invention but do not limit it.

*Example 1*

A stock solution was made up by dissolving 10 grams of vanillin and 0.1 gram of coumarin in 2.13 grams of $Na_2HPO_4$ and adding sufficient water to make one liter. This solution had a pH value of 6.6, and by adding small amounts of NaOH or citric acid the pH value could be adjusted anywhere within the range of 7–5, the addition of 0.4 gram of NaOH raising the pH value to 7.0 and the addition of 1.85 grams of citric acid lowering the pH value to 5.0. Lesser amounts of NaOH and citric acid yielded intermediate pH values.

Example 2

A stock solution was made up in accordance with Example 1 but containing 4.26 grams of $Na_2HPO_4$. This solution had a pH value of 6.8. By the addition of 0.3 gram of NaOH the pH value was raised to 7.0 and by the addition of 3.6 grams of citric acid the pH value was lowered to 5.0. Lesser amounts of NaOH and citric acid produced intermediate pH values.

Example 3

A stock solution was made up in accordance with Example 1 but containing 8.52 grams of $Na_2HPO_4$. The initial pH value was 7.25 which by means of citric acid additions ranging from 1.37 grams to 6.85 grams was lowered to 7.0–5.0 respectively, intermediate amounts of citric acid producing intermediate pH values.

While 0.1 gram per liter of coumarin has been set forth in the foregoing examples, we wish it to be understood that the coumarin concentration may be increased without departing from the invention and that up to 2 grams per liter of coumarin can be dissolved and successfully incorporated into our new compositions if desired, the precise amount employed depending upon the particular use to which the composition is to be put and the specific results desired. Generally we prefer a low coumarin concentration as set forth in the foregoing examples. While $Na_2HPO_4$ is preferred and has been set forth in the examples, sodium citrate and sodium tartrate may also be satisfactorily employed as buffer salts in molecularly proportionate amounts. The compositions responding to our present invention are characterized by the fact that they are stable solutions and do not cause deposition of vanillin under refrigeration. Somewhat greater amounts of vanillin than 10 grams per liter can be employed but we have found that 10 grams per liter is adequate for practically all purposes. Vanillin concentrations up to approximately 15 grams per liter can be employed, however, and fall within and are deemed to be a part of our present invention. In using tartaric acid, we have found that 6.3 grams per liter of tartaric acid with 10 grams of vanillin and 0.1 gram of coumarin make a satisfactory flavoring composition, that a pH value of 5.0 is attained by adding 2.3 grams of NaOH per liter and that a pH value of 7.0 is attained by adding 3.0 grams of NaOH per liter. In using phosphoric acid, $H_3PO_4$, we have found that 7.45 grams thereof may be employed with 10 grams of vanillin and 0.1 gram of coumarin per liter and that the pH range of 5.0 to 7.0 may be secured by adding 3.0 to 5.15 grams per liter, respectively, of NaOH.

The buffer salts have the capacity to dissolve amounts of vanillin in excess of the amounts normally soluble in a given quantity of water and to prevent the deposition of the vanillin from such solution even under refrigeration for extended periods of time. In other words, the buffer salts inhibit crystallization of the dissolved vanillin. The adjustment of the pH value from 5.0–7.0 is an integral part of our invention since we have found that we can satisfactorily utilize neutral and acidic flavoring compositions and that vanillin and coumarin are adequately and permanently soluble under such conditions. We have furthermore found that our aqueous vanillin solutions, at a pH value between 5 and 7, acquire a standard brown color which does not vary upon standing. This characteristic makes it unnecessary to add caramel or other brown coloring matter according to standard practices in preparing present vanillin extracts. We can, however, if we so desire, add a modicum of caramel or the like to our flavoring compositions without departing from the scope or spirit hereof.

The flavoring compositions are used in cooking, baking and food-flavoring procedures in the same manner as alcoholic vanilla or vanillin extracts and therefore no alteration in standard processes is required by the use of our new flavoring composition. Within the scope of the appended claims, other and further additions, omissions, modifications and substitutions may be made without departing from the invention.

We claim:

1. An aqueous, non-alcoholic flavoring solution containing, per liter, about 10–15 grams of vanillin, about 0–2 grams of coumarin, at least one member of the group consisting of $Na_2HPO_4$, $Na_2C_4H_4O_6$, $Na_3C_6H_5O_7$ and reactants forming the same and the balance water, said solution being stable under refrigeration and having a permanent brown caramel-like color after standing.

2. An aqueous, non-alcoholic flavoring composition containing approximately 10 grams per liter of vanillin, approximately 0.1 gram per liter of coumarin and sufficient $Na_2HPO_4$ to yield a pH value between 5 and 7 and the balance water.

3. An aqueous flavoring solution containing the following ingredients in approximately the following relative amounts:

| | | |
|---|---|---|
| Vanillin | grams per liter | 10–15 |
| Coumarin | do | 0.1–2 |
| $Na_2HPO_4$ | do | 2.13–8.52 |
| A pH control agent | Enough to produce a pH value between 5 and 7 | |
| Water | Balance | |

4. An aqueous flavoring containing the following ingredients in approximately the following relative amounts:

| | | |
|---|---|---|
| Vanillin | grams per liter | 10–15 |
| Coumarin | do | 0.1–2 |
| A pH control agent selected from the group consisting of sodium phosphates, sodium citrate and sodium tartrate | Enough to produce a pH value between 5 and 7 | |
| Water | Balance | |

5. An aqueous flavoring solution containing the following ingredients in approximately the following relative amounts:

| | | |
|---|---|---|
| Vanillin | grams per liter | 10 |
| Coumarin | do | 0.1 |
| $Na_2HP_4$ | do | 2.13 |
| Water | Balance | |

6. An aqueous flavoring solution containing the following ingredients in approximately the following relative amounts:

| | | |
|---|---|---|
| Vanillin | grams per liter | 10 |
| Coumarin | do | 0.1 |
| $Na_2HPO_4$ | do | 4.26 |
| Water | Balance | |

7. An aqueous flavoring solution containing the following ingredients in approximately the following relative amounts:

| | | |
|---|---|---|
| Vanillin | grams per liter | 10 |
| Coumarin | do | 0.1 |
| $Na_2HPO_4$ | do | 8.52 |
| Citric acid | do | 1.37–6.85 |
| Water | Balance | |

8. An aqueous, non-alcoholic flavoring composition containing water, at least approximately 10 grams of vanillin per liter of water and a small amount of a buffer salt selected from the group consisting of sodium phosphates, sodium citrate and sodium tartrate sufficient to produce a pH value of 5-7.

9. A composition of matter containing vanillin and a small amount of one of the buffer salts enumerated in claim 8, said composition of matter being characterized by the capacity of dissolving in water to produce a stable, aqueous solution of a pH value of 5-7 in which the vanillin has a concentration of at least 10 grams per liter.

FREDERICK J. ZIMMERMANN.
MAURICE KAYNER.

REFERENCES CITED

The following references are of record in the file of this patent:

UNITED STATES PATENTS

| Number | Name | Date |
| --- | --- | --- |
| 1,515,714 | Wussow | Nov. 18, 1924 |
| 1,602,183 | Thomssen | Oct. 5, 1926 |
| 2,033,612 | Griffith et al. | Mar. 3, 1936 |

FOREIGN PATENTS

| Number | Country | Date |
| --- | --- | --- |
| 490,646 | Great Britain | Aug. 18, 1938 |

OTHER REFERENCES

"Vanilla Extract," by Dean et al., The Journal of Industrial and Engineering Chemistry, July 1916, vol. 8, No. 7, pages 607-614.

Certificate of Correction

Patent No. 2,429,907                                                                      October 28, 1947

FREDERICK J. ZIMMERMANN ET AL.

It is hereby certified that error appears in the printed specification of the above numbered patent requiring correction as follows:

Column 4, line 38, after the word "flavoring" insert *solution*; line 53, for "$Na_2HP_4$" read $Na_2HPO_4$;

and that the said Letters Patent should be read as corrected above, so that the same may conform to the record of the case in the Patent Office.

Signed and sealed this 19th day of December, A. D. 1950.

[SEAL]

THOMAS F. MURPHY,
                                                           *Assistant Commissioner of Patents.*